UNITED STATES PATENT OFFICE.

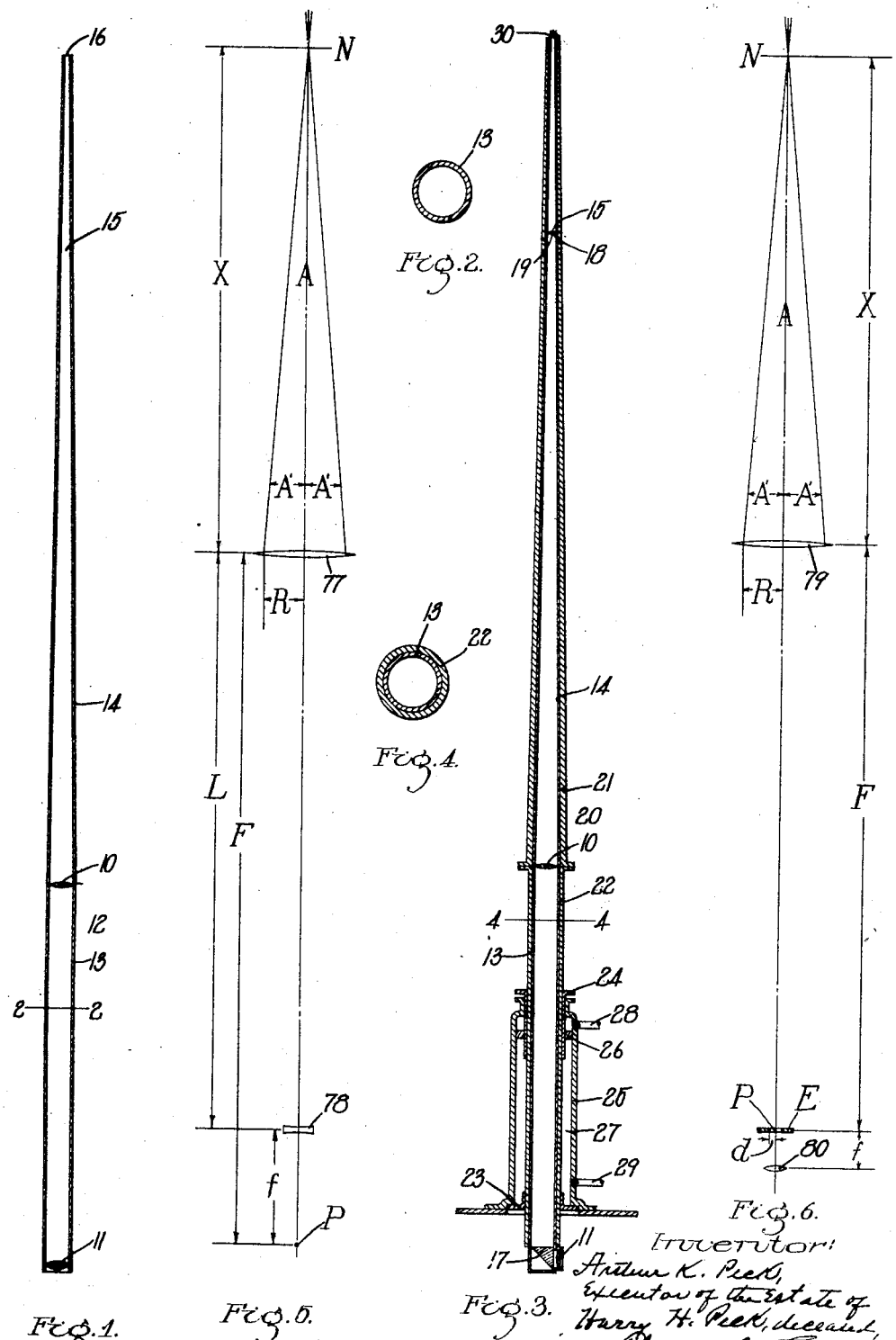

HARRY H. PECK, DECEASED, LATE OF CAMBRIDGE, MASSACHUSETTS, BY ARTHUR K. PECK, EXECUTOR, OF BOSTON, MASSACHUSETTS, ASSIGNOR, BY DIRECT AND MESNE ASSIGNMENTS, OF ONE-HALF TO FORE RIVER SHIPBUILDING CORPORATION, OF QUINCY, MASSACHUSETTS, THREE-EIGHTHS TO ARTHUR K. PECK, OF BOSTON, MASSACHUSETTS, AND ONE-EIGHTH TO NEWELL A. THOMPSON, JR.

OPTICAL INSTRUMENT.

1,314,478.     Specification of Letters Patent.     Patented Aug. 26, 1919.

Original application filed October 23, 1916, Serial No. 127,084. Divided and this application filed November 14, 1918. Serial No. 262,462.

*To all whom it may concern:*

Be it known that HARRY H. PECK, deceased, late a citizen of the United States, residing at Cambridge, in the county of Middlesex, State of Massachusetts, did invent new and useful Improvements in Optical Instruments, (Case B,) of which the following is a specification.

This invention relates to optical instruments, the object of the invention being to provide an optical instrument, the objective end of which is comparatively of very small diameter. This case is divided out of an application for patent on optical instrument, Serial No. 127,084 and filed by me in the United States Patent Office on October 23, 1916.

The invention is particularly adapted to be used in connection with periscopes such as are used on submarines, but while the invention hereinafter described is particularly illustrated and described in connection with periscopes, I wish it to be distinctly understood that I do not limit the invention to periscopes, the same being applicable to other forms of optical instruments. In periscopes it is understood that the portion of the periscope which extends above the water should be of as small diameter as possible in order that it may not be visible to the enemy.

The object of the invention is to obtain a clear view of a distant object through a very small and slender tube or housing.

The object of the invention is further to provide a periscope which is small in diameter where it projects above the water and for a considerable distance below the water so that the same may be difficult of observation by the enemy, and also so that it may not make a perceptible wake in the water, for it is by the wake as well as by the part of the periscope extending above the surface of the water that the submarine is discovered by the enemy.

The invention primarily consists in a telescope objective and an eye-piece with a housing therefor extending beyond the telescope objective in the form of a cone up to and including the "nodal point" of said telescope objective and to a substantial distance beyond said "nodal point" said housing forming a means for snugly inclosing the rays of light from the object viewed.

The invention consists in an optical instrument such as hereinafter set forth in the specification and particularly in the combination and arrangement of parts set forth in the claims.

In the following specification and in the claims I use the term "nodal point" to indicate that point where the rays from a distant object to the object glass of a telescope cross each other.

Referring to the drawings:

Figure 1 is a sectional elevation of an optical instrument embodying the invention.

Fig. 2 is a detail section taken on line 2—2 of Fig. 1.

Fig. 3 is a sectional elevation of the invention as adapted for a periscope including means for raising and lowering the housing and its inclosed lenses.

Fig. 4 is a detail section taken on line 4—4 of Fig. 3.

Fig. 5 is a diagrammatic view of the convex objective lens and concave ocular of a Galilean telescope with lines indicating the angular field of view, and the "nodal point."

Fig. 6 is a diagrammatic view of the convex objective lens and convex eye-piece or ocular of an astronomical telescope with lines indicating the angular field of view, and the "nodal point."

Like numerals refer to like parts throughout the several views of the drawings.

In the drawings, Figs. 1 and 2 illustrate the simplest form of the invention, the same consisting of a telescope objective 10, a telescope eye-piece 11 and a housing 12 for said telescope objective and eye-piece. Said housing 12 consists of a cylindrical portion 13 in which are inclosed the telescope objective and eye-piece. Said housing consists, further, of a conical portion 14 which extends from the telescope objective up to the nodal point 15 and to a substantial distance beyond said nodal point.

The "nodal point" is that point at which a ray of light extending directly from the top of the telescope objective to the bottom of the field of view of said objective crosses another ray of light extending directly from the bottom of said telescope objective to the top of the field of said objective, this point being situated on the principal axis of the telescope objective at a substantial distance from said objective.

The view channel opening 16 at the upper end of the housing is very small, being about three-sixteenths of an inch in diameter, and the rays of light coming from the object viewed in a limited field are of very slight angular extension. The said rays are closely housed by the conical portion 14 which provides a restricted channel for the light rays extending from the crossing point of said rays to the telescope objective 10. Thus it will be seen that a telescopic view of the object is obtained through a very small top aperture.

When the invention is to be used as a periscope, it is desirable that the rays from the ocular should enter the eye from a horizontal position, while the rays as they pass through the periscope housing must pass in a vertical direction, and, therefore, when the invention is embodied in a periscope the same is preferably constructed as illustrated in Fig. 3, in which 10 is the telescope objective, 11 the telescope eye-piece and 17 a totally reflecting prism. 18 is a diaphragm located adjacent to the nodal point 15 and having an opening 19 therein.

The housing 12 is inclosed within an exterior housing 20 consisting of a conical portion 21 and a cylindrical portion 22. The cylindrical portion 22 is slidable in bearings 23 and 24 supported upon a stationary base 25. The cylindrical exterior housing 22 has a piston 26 fast thereto which is movable vertically in a chamber 27 provided in the stationary support 25.

A pipe 28 leads into the chamber 27 above the piston 26 and another pipe 29 leads into said chamber below the piston 26, so that by introducing the proper fluid under pressure through the pipe 28 the periscope housing and the lenses inclosed therein may be lowered. By introducing said fluid under pressure through the pipe 29 said periscope housing and its lenses may be moved upwardly. The liquid or whatever fluid may be used in the chamber 27 for raising and lowering the periscope housing passes inwardly through the pipe 28 and at the same time passes outwardly through the pipe 29 and vice versa, according to whether the periscope housing is being lowered or raised, respectively. At the extreme upper end of the housing a totally reflecting prism 30 is provided.

In using the improved instrument when the same is embodied in the form illustrated in Fig. 3 and when the same is used as a periscope, the observer sees the object from the eye-piece 11 and the image is produced after the rays of light pass through the totally reflecting prism 30, the diaphragm 18, the objective 10, the totally reflecting prism 17 and the eye-piece 11. The rays of light which are diverted by the totally reflecting prism 30 to cross at or near the "nodal point" pass down the conical portion of the housing to the telescope objective 10 and from the telescope objective the said rays pass to the totally reflecting prism 17 and are reflected by said prism through the telescope eye-piece 11, from whence they converge to the eye of the observer.

The housing with its lenses is raised or lowered as hereinbefore described and may be rotated by rotating the cylindrical portion 22 of the exterior housing in its bearings 23 and 24. It will be seen that by the construction hereinbefore set forth a very slender tube may be used for that portion of the housing shaft which extends above the surface of the water and the object of using such a tube is to render the portion of the periscope top which projects above the water slender and as inconspicuous as possible in order to avoid discovery by the enemy.

It will be readily understood that the nodal point, as hereinbefore defined, is formed by the crossing of the rays extending from the top and bottom of the telescope objective to the bottom and top, respectively, of the field of said objective and may, in practice, extend over several inches longitudinally of the axis of the objective on account of the very slight divergence of the rays from each other and, therefore, said nodal point for a given diameter objective and given field is not limited to an exact geometrical point, but may be in practice at any point within several inches longitudinally of the axis of said objective.

In order that sufficient data may be set forth to enable one skilled in the art to find the nodal point, for an objective of given diameter and focus, two principal types of telescopes must be considered; first, the Dutch or Galilean telescope and second the astronomical telescope.

*First case, Galilean telescope.*

The lenses or this instrument in its simplest form consist, as illustrated in Fig. 5, of a convex objective lens 77 and a concave ocular 78, the rear focal point of the ocular being at or near the rear focal point of the objective as at P on the principal axis AP of the lenses where P is the rear focal point of both lenses.

The following formula may be used for determining the angular field of view; it is a standard formula.

$$\tan A' = \frac{1}{M} \times \frac{R + rM}{L + DM}$$

in which—

A′=half the angle of the angular field of view.

The following data is needed for the calculation of the angle A′.

R=the free radius of the objective.
F=the focal length of the objective.
$f$=the focal length of the eye lens (the ocular).
L=the optical length of the telescope; this is practically F−$f$.
M=the magnification of the system; this is equal to $\frac{F}{f}$.
$r$=the radius of the pupil of the eye usually taken as 0.2 centimeters (practically 1/13 inch).

D=the distance between the eye of the observer and the ocular of the telescope; it may be taken as 2 centimeters or say 3/4 of an inch.

Assuming that we have a Galilean telescope, therefore, in which the measurements are as follows:

$r$=1/13 of an inch.
R=0.674
F=18 inches
$f$=3 inches
$M = \frac{F}{f} = 6$
L=F−$f$=15 inches
D=3/4 inch.

and substitute these dimensions in the formula hereinbefore set forth, we have $$\tan A' = \frac{1}{6} \times \frac{0.674 + (1/13 \times 6)}{15 + (3/4 \times 6)} = .0097$$

The corresponding angle is 33′ 23″ and the greatest angular field visible in the telescope is twice this or 1° 6′ 46″.

To obtain the "nodal point" N we have the simple trigonometrical relation of $$\tan A' = \frac{R}{X} \text{ or } X = \frac{R}{\tan A'} = \frac{0.674}{\tan 33' 23''} = \frac{0.674}{.0097} = 69.4 \text{ in.}$$

and, therefore, the "nodal point" N lies 69.4 inches from the lens 77.

*Second case, astronomical telescope.*

The simplest astronomical telescope consists of a convex objective lens 79 and a convex eye piece or ocular 80, as illustrated in Fig. 6, the front focal point of the ocular being at or near the rear focal point of the objective as indicated in said figure at P.

In order to obtain a sharply defined border to the field of view it is customary to place a diaphragm E at the common focal point of the lenses. Then, if the radius of the hole in the diaphragm be denoted by $d$ the half angle of the field of view of the telescope is obtained by the formula $$\tan A' = \frac{d}{fM}$$

Where M is the magnification=$\frac{F}{f}$ or this formula may be simplified considerably as follows: Knowing that the magnification M is the ratio of the focal lengths F and $f$ the formula may be written $$\tan A' = \frac{d}{fM} = \frac{d}{f \frac{F}{f}} = \frac{d}{F}$$

a very simple relation.

As an example of the application of this formula: Assuming F to be 12 inches and the stop radius $d$=0.1244 (practically 1/8 of an inch), then we obtain $$\tan A' = \frac{0.1244}{12} = 0.01037$$

which is the tangent of an angle of 35′ 39″. The whole angle of view of the telescope is, therefore, 1° 11′ 18″. A calculation for the "nodal point" N then becomes as before for an instrument in which R=0.674

$$\tan A' = \frac{R}{X} \text{ or } X = \frac{R}{\tan A'} = \frac{0.674}{0.01037} = 65 \text{ inches.}$$

Having thus described the invention, what I claim and desire by Letters Patent to secure is:

1. An optical instrument having, in combination, a telescope objective, a telescope eye-piece, a housing therefor, said housing extending beyond said telescope objective in the form of a cone up to and including the nodal point of said telescope objective and a substantial distance beyond said nodal point.

2. An optical instrument having, in combination, a telescope objective, a telescope eye-piece, a housing therefor, said housing extending beyond said telescope objective in the form of a cone up to and including the nodal point of said telescope objective and a substantial distance beyond said nodal point and a diaphragm located in said housing adjacent to said nodal point.

3. An optical instrument having, in combination, a telescope objective, a telescope eye-piece, a housing therefor, said housing extending beyond said telescope objective in the form of a cone up to and including the nodal point of said telescope objective and a substantial distance beyond said nodal point and a totally reflecting prism at the objective end of said housing.

4. An optical instrument having, in combination, a telescope objective, a telescope eye-piece and a housing therefor, said housing extending beyond said telescope objective up to and including the nodal point of said telescope objective and a substantial distance beyond said nodal point, the inner walls of said housing converging toward said nodal point from said objective and to a substantial distance beyond said nodal point.

5. An optical instrument having, in combination, a telescope objective, a telescope eye-piece, a housing therefor, said housing extending beyond said telescope objective in the form of a cone up to and inclosing the nodal point of said telescope objective and a substantial distance beyond said nodal point, and means to raise and lower said housing.

6. An optical instrument having, in combination, a telescope objective, a telescope eye-piece, a housing therefor, said housing extending beyond said telescope objective in the form of a cone up to and inclosing the nodal point of said telescope objective and a substantial distance beyond said nodal point, a support upon which said housing is rotatably mounted, and means to raise and lower said housing.

7. An optical instrument having, in combination, a telescope objective, a telescope eye-piece, a housing therefor, said housing extending beyond said telescope objective in the form of a cone up to and including the nodal point of said objective and to a substantial distance therebeyond, and a totally reflecting prism located in said housing intermediate said eye-piece and objective and adjacent to said eye-piece.

8. An optical instrument having, in combination, a telescope objective, a telescope eye-piece, a housing therefor, said housing extending beyond said telescope objective in the form of a cone up to and including the nodal point of said objective and to a substantial distance therebeyond, a totally reflecting prism located at one end of said housing adjacent to said eye-piece and intermediate said eye-piece and objective, and another totally reflecting prism located in the opposite end of said housing.

9. An optical instrument having, in combination, a telescope objective, a telescope eye-piece, a housing therefor, said housing extending beyond said telescope objective up to and including the nodal point of said telescope objective and a substantial distance beyond said nodal point and having an opening for the rays of light in its objective end adjacent to said nodal point of substantially smaller diameter than the diameter of said telescope objective.

In testimony whereof I, ARTHUR K. PECK, executor of the estate of HARRY H. PECK, deceased, have hereunto set my hand in presence of two subscribing witnesses.

ARTHUR H. PECK,
*Executor of the estate of Harry H. Peck, deceased.*

Witnesses:
DANIEL A. ROLLINS,
CHARLES S. GOODING.

Copies of this patent may be obtained for five cents each, by addressing the "Commissioner of Patents, Washington, D. C."